(12) United States Patent
Garfinkle et al.

(10) Patent No.: US 7,680,823 B2
(45) Date of Patent: Mar. 16, 2010

(54) CUSTOM REPORT GENERATION

(75) Inventors: Steven M. Garfinkle, Cold Spring, NY (US); Balakrishna Chivukula, Bethel, CT (US); Kalyan C. Bandaru, Danbury, CT (US); Sudheendra Parimi, Naugatuck, CT (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 10/908,568

(22) Filed: May 17, 2005

(65) Prior Publication Data

US 2006/0265641 A1 Nov. 23, 2006

(51) Int. Cl.
G06F 7/00 (2006.01)
G06F 17/27 (2006.01)
G06F 17/30 (2006.01)
G06Q 40/00 (2006.01)

(52) U.S. Cl. .................. 707/104.1; 715/255; 705/35
(58) Field of Classification Search ................ 707/1
See application file for complete search history.

(56) References Cited

U.S. PATENT DOCUMENTS

| | | | |
|---|---|---|---|
| 6,289,382 B1 * | 9/2001 | Bowman-Amuah | 709/226 |
| 6,550,057 B1 * | 4/2003 | Bowman-Amuah | 717/126 |
| 6,640,249 B1 * | 10/2003 | Bowman-Amuah | 709/228 |
| 6,715,145 B1 * | 3/2004 | Bowman-Amuah | 718/101 |
| 6,742,015 B1 * | 5/2004 | Bowman-Amuah | 718/101 |
| 6,842,906 B1 * | 1/2005 | Bowman-Amuah | 719/330 |
| 7,289,964 B1 * | 10/2007 | Bowman-Amuah | 705/1 |
| 2002/0109718 A1 | 8/2002 | Mansour et al. | |
| 2002/0129096 A1 | 9/2002 | Mansour et al. | |
| 2003/0058277 A1 * | 3/2003 | Bowman-Amuah | 345/765 |
| 2003/0084093 A1 | 5/2003 | Grason et al. | |
| 2003/0154177 A1 * | 8/2003 | Holland et al. | 706/60 |
| 2003/0233343 A1 * | 12/2003 | Li | 707/1 |
| 2004/0205617 A1 * | 10/2004 | Light | 715/523 |
| 2004/0221233 A1 * | 11/2004 | Thielen | 715/530 |
| 2004/0236858 A1 * | 11/2004 | Schwartz | 709/230 |
| 2006/0048048 A1 * | 3/2006 | Welcker et al. | 715/513 |
| 2006/0048096 A1 * | 3/2006 | Jiang et al. | 717/115 |
| 2006/0112123 A1 * | 5/2006 | Clark et al. | 707/101 |
| 2006/0253495 A1 * | 11/2006 | Png | 707/200 |
| 2007/0061489 A1 * | 3/2007 | Lev-Ami et al. | 709/246 |

OTHER PUBLICATIONS

"Getting Started with Reporting Services" dated Mar. 26, 2004.*

* cited by examiner

*Primary Examiner*—Neveen Abel Jalil
*Assistant Examiner*—Tarek Chbouki
(74) *Attorney, Agent, or Firm*—Yuanmin Cai; Hoffman Warnick LLC

(57) ABSTRACT

An improved solution for generating a custom report is provided. A tagged file is obtained, which comprises data and graphic information for the custom report. Image data for the custom report is generated based on the tagged file. The custom report is generated based on the image data, the tagged file, and a report definition for the custom report. In one embodiment, a computer infrastructure is provided for generating a custom report in multiple report formats based on content received from one or more diverse data sources.

16 Claims, 3 Drawing Sheets

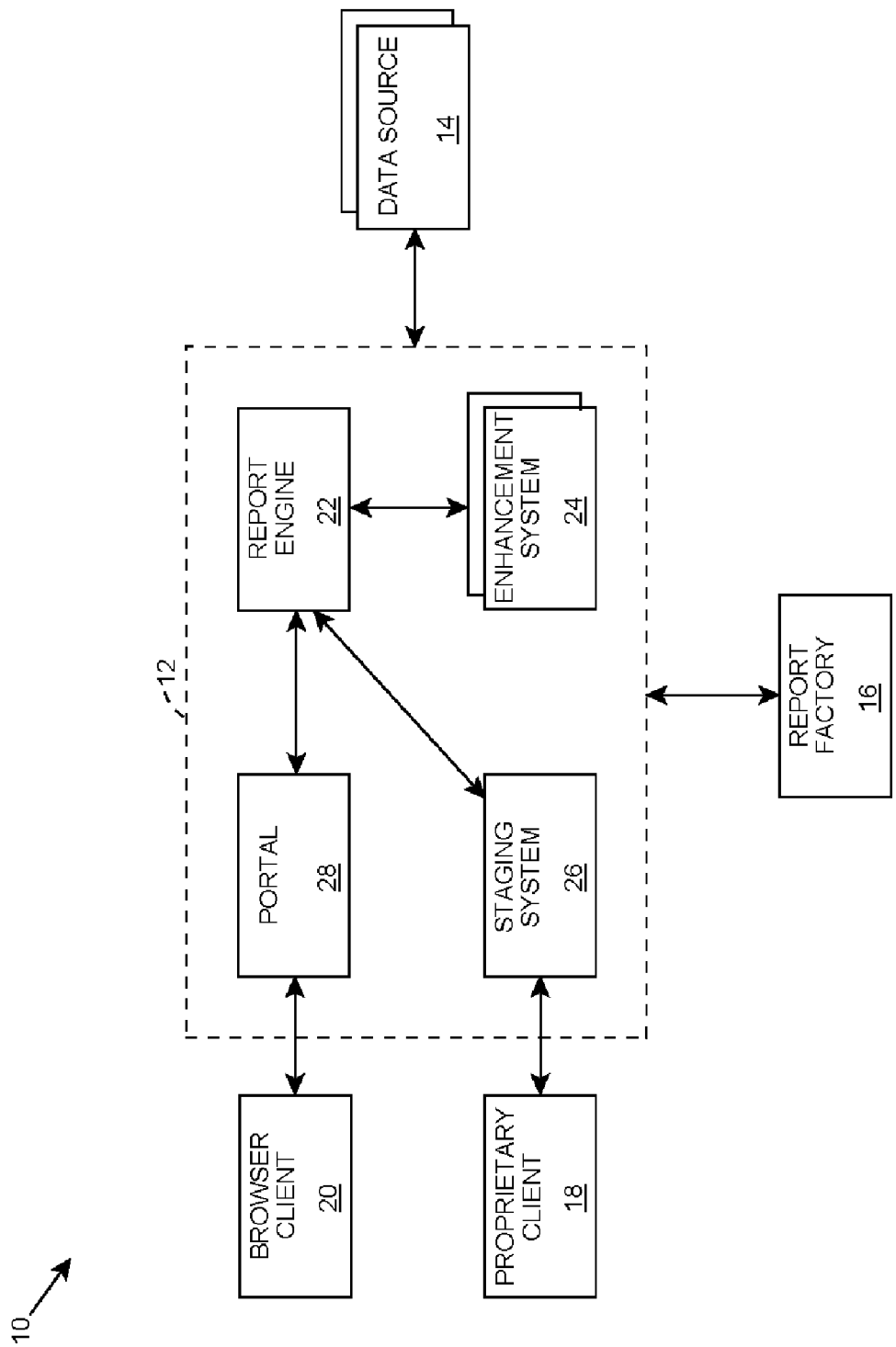

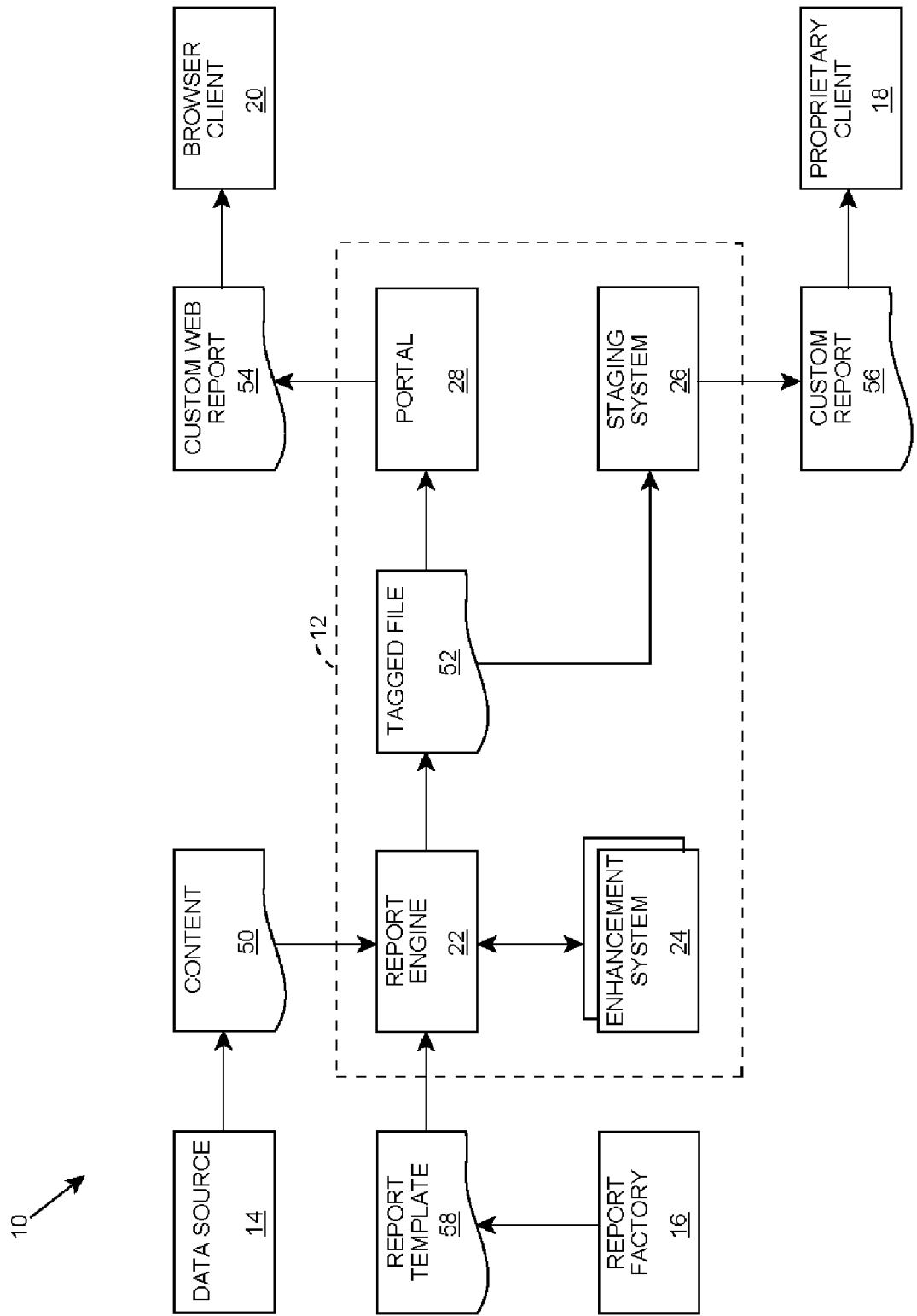

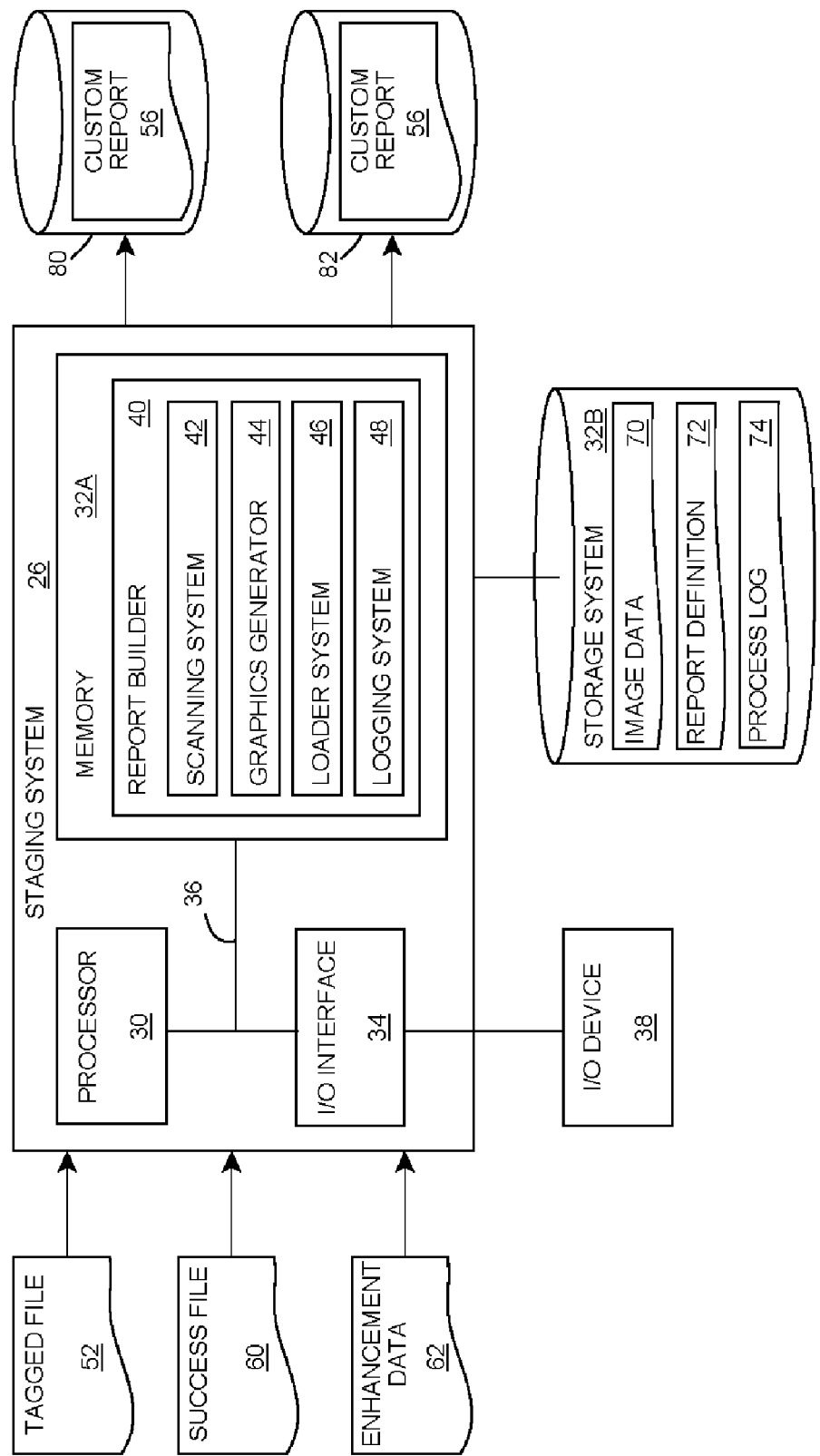

CUSTOM REPORT GENERATION

BACKGROUND OF THE INVENTION

1. Technical Field

The invention relates generally to report generation, and more particularly, to an improved solution for generating a custom report.

2. Related Art

Increasingly, users expect up-to-date information displayed in easy to read reports. Additionally, users desire to access these reports using any of several different computing devices and/or software applications. For example, while a user is connected to a network (e.g., in the office), he/she may desire to use messaging, a web browser, and/or groupware software such as Lotus Notes offered by International Business Machines Corp. of Armonk, N.Y., to view a particular report. However, while the user is disconnected from the network (e.g., out of the office), the same user may desire to use tools that provide off-line capability, such as Lotus Notes, to view the same report. Additionally, a desired format for a particular report may vary from user to user and/or user group to user group. To date, available solutions include various disadvantages, such as being limited to a particular computing platform and/or providing poor performance. To this extent, a need exists for an improved solution for generating a custom report.

SUMMARY OF THE INVENTION

The invention provides an improved solution for generating a custom report. Under the invention, a tagged file, which comprises data and graphic information for the custom report, is obtained. Image data for the custom report is generated based on the tagged file. The custom report is generated based on the image data, the tagged file, and a report definition for the custom report. In one embodiment, a computer infrastructure is provided for generating a custom report in multiple report formats based on content received from one or more diverse data sources.

A first aspect of the invention provides a method of generating a custom report, the method comprising: obtaining a tagged file that comprises data and graphic information for the custom report; generating image data based on the tagged file; obtaining a report definition for the custom report; and generating the custom report based on the image data, the tagged file, and the report definition.

A second aspect of the invention provides a system for generating a custom report, the system comprising: means for obtaining a tagged file that comprises data and graphic information for the custom report; means for generating image data based on the tagged file; means for obtaining a report definition for the custom report; and means for generating the custom report based on the image data, the tagged file, and the report definition.

A third aspect of the invention provides a computer infrastructure for generating a custom report, the computer infrastructure comprising: means for receiving data for the custom report; means for obtaining graphic instructions for the custom report; means for generating a tagged file based on the data and the graphic instructions; means for generating image data based on the tagged file; means for obtaining a report definition for the custom report; means for generating the custom report in a first format based on the image data, the tagged file, and the report definition; and means for generating the custom report in a second format based on the image data, the tagged file, and the report definition.

A fourth aspect of the invention provides a program product stored on a computer-readable medium, which when executed, generates a custom report, the program product comprising: program code for obtaining a tagged file that comprises data and graphic information for the custom report; program code for generating image data based on the tagged file; program code for obtaining a report definition for the custom report; and program code for generating the custom report based on the image data, the tagged file, and the report definition.

A fifth aspect of the invention provides a method of generating a custom report, the method comprising: receiving data for the custom report; obtaining graphic instructions for the custom report; generating a tagged file based on the data and the graphic instructions; generating image data based on the tagged file; obtaining a report definition for the custom report; generating the custom report in a first format based on the image data, the tagged file, and the report definition; and generating the custom report in a second format based on the image data, the tagged file, and the report definition.

A sixth aspect of the invention provides a computer-readable medium that includes computer program code to enable a computer infrastructure to generate a custom report, the computer-readable medium comprising computer program code for performing the method steps of the invention.

A seventh aspect of the invention provides a business method for generating a custom report, the business method comprising managing a computer infrastructure that performs each of the steps of the invention; and receiving payment based on the managing step.

An eighth aspect of the invention provides a method of generating a system for generating a custom report, the method comprising: obtaining a computer infrastructure; and deploying means for performing each of the steps of the invention to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 1 shows an illustrative environment for generating a custom report;

FIG. 2 shows an illustrative process flow for generating a custom report within the environment of FIG. 1; and FIG. 3 shows an illustrative embodiment of the staging system of FIG. 1.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides an improved solution for generating a custom report. Under the invention, a tagged file, which comprises data and graphic information for the custom report, is obtained. Image data for the custom report is generated based on the tagged file. The custom report is generated based on the image data, the tagged file, and a report definition for the custom report. In one embodiment, a computer infrastructure is provided for generating a custom report in multiple report formats based on content received from one or more diverse data sources.

Turning to the drawings, FIG. 1 shows an illustrative environment 10 for generating a custom report. To this extent, environment 10 includes a computer infrastructure 12 that can perform the various process steps described herein for generating a custom report. In particular, computer infrastructure 12 can receive content from one or more data sources 14. Data source 14 can comprise any type of content provider including, for example, a proprietary data source, a public data source, a private data source, and the like. To this extent, the content can comprise any type of formatted data, such as a data file, database records, or the like. Additionally, computer infrastructure 12 can receive one or more report templates from a report factory 16. Report factory 16 can comprise any type of development area for managing (e.g., preparing, modifying, debugging, etc.) various report templates for use when generating custom reports on demand.

In any event, computer infrastructure 12 generates a custom report based on the content and/or report template(s). The generated custom report can be provided for use by a proprietary client 18, i.e., a client that desires to use a proprietary software application, such as Lotus Notes or the like, for viewing the custom report. Alternatively, the custom report can be provided for use by a browser client 20, i.e., a client that desires to use a ubiquitous software application, such as a web browser or the like, for viewing the custom report. To this extent, computer infrastructure 12 can generate two or more custom reports, each of which is formatted for display by a different software application, based on the same content and/or report template. Further, each custom report can be generated "on demand," e.g., when requested by a particular client 18, 20.

Computer infrastructure 12 is shown including a plurality of computing devices, such as a report engine 22, one or more enhancement systems 24, a staging system 26, and a portal 28. To this extent, the plurality of computing devices can communicate over any type of wired and/or wireless communications link, such as a network, a shared memory, or the like, to perform the various process steps described herein. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques. In one embodiment, computer infrastructure 12 comprises a server cluster that communicates with data source 14, report factory 16, proprietary client 18, and/or browser client 20 over a private and/or public network. However, it is understood that computer infrastructure 12 is only illustrative of various types of computer infrastructures. For example, in another embodiment, computer infrastructure 12 could comprise a single computing device that includes various systems for implementing the process steps described herein.

Operation of each of the components of computer infrastructure 12 is discussed with reference to FIG. 2, which shows an illustrative process flow for generating a custom report within environment 10. In particular, report engine 22 obtains content 50 from data source 14. Report engine 22 can receive notice and/or detect the presence of new content 50 using any known or later developed solution. For example, content 50 can be included in a file that is stored in a designated location (e.g., a file folder), which in turn is periodically polled by report engine 22. Alternatively, data source 14 can update content 50 stored in a database or the like, and copy a trigger file to a designated location, which is detected by report engine 22.

Regardless, report engine 22 can extract data from content 50. The data can be extracted using any known or later developed solution. For example, report engine 22 can perform one or more database queries, parse a data file, such as a comma separated variable file, or the like. While extracting data from content 50, report engine 22 can store and retrieve the data from a local database or the like. Additionally, to provide increased efficiency, report engine 22 can use one or more enhancement systems 24 to provide enhanced functionality, such as improved management of content 50 and/or the data extracted therefrom. For example, one enhancement system 24 can comprise a third party data container that provides an interface for managing data stored thereon. Further, another enhancement system 24 can comprise a local data cache that stores frequently accessed data for faster read/write operations.

Report engine 22 can generate a tagged file 52 based on the data extracted from content 50. Tagged file 52 can comprise any type of data format for defining and/or describing data stored therein. For example, in one embodiment, tagged file 52 comprises an extensible markup language (XML) file. However, it is understood that tagged file 52 could comprise any type of format that provides similar functionality. In any event, tagged file 52 can further be based on a report template 58. To this extent, report factory 16 can provide a set (one or more) of report templates 58 to report engine 22 for use in generating tagged files 52. In this case, report engine 22 can manage the set of report templates 58 and select an appropriate report template 58 for generating tagged file 52 based on the data extracted from content 50. For example, content 50 can comprise an indication of a type of custom report. Based on this indication, report engine 22 can select a corresponding report template 58. Alternatively, report engine 22 can automatically determine the report template 58 based on one or more attributes of content 50 (e.g., a file name, a location, or the like) and/or the data (e.g., sales, human resources, etc.) included in content 50. Further, it is understood that data in content 50 could be incorporated in multiple custom reports each of which is based on a different report template 58. In this case, report engine 22 can generate a unique tagged file 52 for each of the custom reports to be generated.

Each report template 58 can comprise graphic instructions that are used to generate the custom report. The graphic instructions can comprise a layout for the data, a set of solutions for highlighting data within the custom report, and/or the like. Regardless, report engine 22 can incorporate the graphic instructions from report template 58 into tagged file 52. In this case, tagged file 52 will comprise both the graphic instructions and the data required for generating a custom report.

Once generated, report engine 22 can provide tagged file 52 for use by one or more systems in generating the custom report. For example, report engine 22 can provide tagged file 52 for use by a portal 28 in generating a custom web report 54. Custom web report 54 can comprise data stored in a public format, such as a web page, which can be viewed by a browser client 20. Similarly, report engine 22 can provide tagged file 52 for use by a staging system 26 in generating a custom report 56. Custom report 56 can comprise data stored in a proprietary format, such as Lotus Notes, which can be viewed by a proprietary client 18.

To this extent, FIG. 3 shows an illustrative embodiment of staging system 26. In this embodiment, staging system 26 is shown implemented as a computing device that comprises a report builder 40, which enables staging system 26 to generate custom report 56 by performing the process steps described herein. Staging system 26 is shown including a processor 30, a memory 32A, an input/output (I/O) interface 34, and a bus 36. Further, staging system 26 is shown in communication with an external I/O device/resource 38 and a storage system 32B. As is known in the art, in general, processor 30 executes computer program code, such as report builder 40, that is stored in memory 32A and/or storage system 32B. While executing computer program code, processor 30 can read and/or write data, such as custom report 56, to/from memory 32A, storage system 32B, and/or I/O interface 34. Bus 36 provides a communications link between each of the components in staging system 26. I/O device 38 can comprise any device that enables a user to interact with staging system 26 or any device that enables staging system 26 to communicate with one or more other computing devices (e.g., report engine 22 of FIG. 2).

In any event, staging system 26 can comprise any general purpose computing article of manufacture capable of executing computer program code installed by a user (e.g., a personal computer, server, handheld device, etc.). However, it is understood that staging system 26 and report builder 40 are only representative of various possible equivalent computing devices that may perform the various process steps for generating custom report 56. To this extent, in other embodiments, staging system 26 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

As previously mentioned and discussed further below, report builder 40 enables staging system 26 to generate custom report 56. To this extent, report builder 40 is shown including a scanning system 42 for obtaining a tagged file 52, a graphics generator 44 for generating image data 70 based on tagged file 52, and a loader system 46 for generating the custom report 56 based on tagged file 52 and image data 70. Additionally, report builder 40 is shown including a logging system 48 for logging the custom report generation in a process log 74. Operation of each of these systems is discussed further below. However, it is understood that some of the various systems shown in FIG. 3 can be implemented independently, combined, and/or stored in memory for one or more separate computing devices that are included in computer infrastructure 12 (FIG. 1). Further, it is understood that some of the systems and/or functionality may not be implemented, or additional systems and/or functionality may be included as part of environment 10 (FIG. 1).

Scanning system 42 can receive notification of a new tagged file 52 from which a custom report 56 is to be generated. For example, in one embodiment, scanning system 42 can periodically (e.g., every fifteen minutes) scan a designated storage area for the presence of a success file 60. In this case, report engine 22 (FIG. 2) can generate and provide success file 60 for use by report builder 40 when the new tagged file 52 is available. Once success file 60 has been located, scanning system 42 can read its contents. To this extent, success file 60 can identify the newly available tagged file 52 and/or one or more desired attributes of custom report 56.

Scanning system 42 can invoke graphics generator 44 and provide graphics generator 44 with information on tagged file 52. Graphics generator 44 can read the contents of tagged file 52 and generate image data 70 based on the data and graphic information contained therein. For example, tagged file 52 could comprise a "<GRAPH>" tag indicating that a graph should be generated based on certain data included in tagged file 52. Additionally, tagged file 52 can include various attributes (e.g., a type of graph) for the image data 70. In response, graphics generator 44 will generate image data 70 corresponding to the desired graph. Once generated, graphics generator 44 can store image data 70 in a database or the like for further processing.

Loader system 46 can obtain the contents of tagged file 52 and corresponding image data 70 in order to generate custom report 56. To this extent, loader system 46 can read tagged file 52 and acquire image data 70 from the database in which it is stored. Additionally, loader system 46 can obtain a report definition 72 for custom report 56. Report definition 72 can include various details of custom report 56. For example, report definition 72 can comprise colors/shading to be used in custom report 56, a screen resolution for custom report 56, and/or the like. Further, report definition 72 can comprise static content for custom report 56 (e.g., explanations of meaning of data, disclaimers, etc.). In any event, loader system 46 can generate custom report 56 based on tagged file 52, image data 70 and report definition 72. In one embodiment, loader system 46 only generates custom report 56 after it is requested by a particular user/client. In this case, graphics generator 44 can continually update image data 70 when a new tagged file 52 is received, and loader system 46 can access the most recent tagged file 52 and image data 70 to generate custom report 56. Regardless, report builder 40 provides an improved solution for generating a custom report 56 in which little to no knowledge of content 50 (FIG. 2) is required. Additionally, report builder 40 segregates the generation of custom report 56 into discrete process steps, each of which can be separately scheduled.

Once custom report 56 has been generated, loader system 46 can perform various additional steps. For example, loader system 46 can relocate tagged file 52 to a processed file location where it can be stored for possible future reference. Additionally, loader system 46 can provide custom report 56 for storage in a distribution database 80, from which users can access and view custom report 56. Further, loader system 46 can replicate custom report 56 in one or more additional replication distribution databases 82 (e.g., regional servers) for access by users.

Still further, logging system 48 can log the generation of custom report 56 in a process log 74. To this extent, process log 74 can comprise various entries for each custom report generation, including, for example, a timestamp, a result, and/or a summary of each of a plurality of steps performed for the corresponding custom report generation. Additionally, logging system 48 can update a set of custom report generation statistics based on the generated custom report 56. For example, the set of statistics can comprise a number of times custom report 56 has been generated, a time for the most recent generation, and the like. Alternatively, logging system 48 can dynamically generate the custom report generation statistics based on process log 74 for custom report 56.

In addition to tagged file 52, report builder 40 can incorporate various additional information for generating custom report 56. To this extent, report builder 40 can obtain enhancement data 62, which report builder 40 can use in generating custom report 56. In one embodiment, enhancement data 62 can be provided to report builder 40 by report engine 22 (FIG. 2). In this case, report engine 22 can obtain enhancement data 62 from one or more enhancement systems 24 (FIG. 2). Alternatively, report builder 40 can obtain enhancement data 62 directly from one or more enhancement systems 24 and/or a database in which enhancement data 62 is stored.

In any event, graphics generator 44 can use enhancement data 62 when generating image data 70. For example, enhancement data 62 can comprise human factor data such as a color preference, a shading preference, or the like. In this case, graphics generator 44 can generate image data 70 based on the human factor data. To this extent, report definition 72 can comprise a set of default preferences for image data 70, such as the use of green to indicate a normal status (e.g., a value is within an expected range), and red to indicate a problem status (e.g., a value is outside of an expected range). As a result, graphics generator 44 will default to using these colors to indicate the corresponding statuses in image data 70. However, graphics generator 44 can obtain enhancement data 62 that alters these preferences. For example, enhancement data 62 for a color blind user can specify the use of different shading and/or stippling to indicate the different statuses. Graphics generator 44 can use the preferences specified in enhancement data 62 when generating image data 70 for the particular user.

Additionally, loader system 46 can use enhancement data 62 when generating custom report 56. For example, enhancement data 62 can comprise linkage information for data included within tagged file 52. The linkage information can comprise information on accessing another custom report (e.g., a monthly sales report) from which the corresponding data (e.g., a quarterly sales amount) included in tagged file 52 was derived. In this case, when loader system 46 generates custom report 56, a link can be provided to enable a user to obtain the second custom report when viewing the data/image data 70 in custom report 56. As a result, custom report 56 can enable a user to "drill down" to view additional levels of detail.

Further, enhancement data 62 can comprise security data for custom report 56. In this case, loader system 46 can include the security data within custom report 56 to limit the users that have access to view custom report 56. Alternatively, loader system 46 can use the security data to determine the appropriate distribution database(s) 80, 82 and/or locations within distribution database(s) 80, 82 to store custom report 56.

Returning to FIG. 2, as discussed above, tagged file 52 can also be provided to a portal 28, which can generate a custom web report 54. To this extent, portal 28 can generate image data 70 (FIG. 3) and custom web report 54 in the same manner as shown and discussed with reference to staging system 26. Alternatively, portal 28 can receive image data 70 from staging system 26 for use in generating custom web report 54. In either case, portal 28 can push custom web report 54 to a web site or the like for access by one or more browser clients 20. As a result, tagged file 52 can define a core format that is used to generate custom web report 54 and custom report 56. Consequently, despite custom web report 54 and custom report 56 having two different report formats (e.g., Lotus Notes and a web page), the user is given a consistent report format when viewing a custom report using different devices and/or different software applications.

Report engine 22, staging system 26, and/or portal 28 can further incorporate various additional functionality. For example, report engine 22 can schedule the generation of custom report 56 and/or custom web report 54. In one embodiment, a black out period for a particular custom report 56 and/or custom web report 54 can be defined during which the reports 54, 56 are not updated and/or accessible to users. In this case, despite receiving new content 50, report engine 22 can wait to generate tagged file 52 until the black out period has elapsed. Alternatively, one or more tagged files 52 can be generated and provided to staging system 26 and/or portal 28, but report engine 22 can refrain from notifying staging system 26 and/or portal 28 of the new tagged file(s) 52 until after the blackout period. Further, rather than deploying custom web report 54 and/or custom report 56 for subsequent access by one or more users, portal 28 and/or staging system 26 could send the corresponding reports 54, 56, respectively, to user(s) via electronic mail or the like.

Still further, by separating the workload into various components, load balancing can be performed within computer infrastructure 12. The load balancing enables the use of a smaller computing infrastructure to generate the reports 54, 56. For example, report engine 22 can select one of a plurality of staging systems 26 and/or portals 28 to generate reports 56, 54, respectively, based on a workload of computer infrastructure 12. In this case, when a particular staging system 26 is busy processing another tagged file, tagged file 52 can be provided to a second staging system 26.

While shown and described herein as a method and system for generating a custom report, it is understood that the invention further provides various alternative embodiments. For example, in one embodiment, the invention provides a computer-readable medium that includes computer program code to enable a computer infrastructure to generate a custom report. To this extent, the computer-readable medium includes program code, such as report builder 40 (FIG. 3), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 32A (FIG. 3) and/or storage system 32B (FIG. 3) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to generate a custom report as described above. In this case, the service provider can manage (e.g., create, maintain, support, etc.) a computer infrastructure, such as computer infrastructure 12 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for generating a custom report. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as staging system 26 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of generating a custom report in a portal environment, the method comprising:
    obtaining a tagged file that comprises content to be included in the custom report, the obtaining of the tagged file including:
        detecting a file including new data for the custom report;
        extracting the content from the detected file;
        selecting at least one of a plurality of report templates based on at least one of: an attribute of the content or a data item in the content;
        obtaining at least one graphic instruction for the custom report from the selected at least one report template; and
        generating the tagged file based on the data and the at least one graphic instruction;
    obtaining graphic information to generate the custom report, the graphic information defining a set of attributes to display the content;
    generating and storing image data, in a graphical format, to be included in the custom report based on a first portion of the content and the graphic information of the tagged file in response to the presence of a new tagged file;
    obtaining a report definition for the custom report separate from the tagged file, the report definition including at least one detail for generating the custom report, the at least one detail including information for rendering the custom report and static content for the custom report;
    generating and storing the custom report in response to a request for the custom report and subsequent to the generating and storing image data, the generating the custom report being based on the image data, the tagged file, and the report definition, wherein the custom report includes a second portion of the content in the tagged file and the image data arranged according to the report definition; and
    logging the custom report generation in a process log.

2. The method of claim 1, further comprising storing the custom report in a distribution database.

3. The method of claim 1, further comprising relocating the tagged file to a processed file location.

4. The method of claim 1, further comprising updating a set of custom report generation statistics based on the generated custom report.

5. The method of claim 1, further comprising obtaining enhancement data for the custom report, wherein the generating the custom report step is further based on the enhancement data.

6. A system for generating a custom report in a portal environment, the system comprising a processor and a memory and being configured to perform the following:
    obtain a tagged file that comprises content to be included in the custom report, the obtaining of the tagged file including:
        detecting a file including new data for the custom report;
        extracting the content from the detected file;
        selecting at least one of a plurality of report templates based on at least one of: an attribute of the content or a data item in the content;
        obtaining at least one graphic instruction for the custom report from the selected at least one report template; and
        generating the tagged file based on the data and the at least one graphic instruction;
    obtain graphic information to generate the custom report, the graphic information defining a set of attributes to display the content;
    generate and store image data, in a graphical format, to be included in the custom report based on a first portion of the content and the graphic information of the tagged file in response to the presence of a new tagged file;
    obtain a report definition for the custom report separate from the tagged file, the report definition including at least one detail for generating the custom report, the at least one detail including information for rendering the custom report and static content for the custom report;
    generate and store the custom report in response to a request for the custom report and subsequent to the generating and storing image data, the generating of the custom report being based on the image data, the tagged file, and the report definition, wherein the custom report includes a second portion of the content in the tagged file and the image data arranged according to the report definition; and
    log the custom report generation in a process log.

7. The system of claim 6, being further configured to store the custom report in a distribution database.

8. The system of claim 6, being further configured to relocate the tagged file to a processed file location.

9. The system of claim 6, being further configured to update a set of custom report generation statistics based on the generated custom report.

10. The system of claim 6, being further operable to obtain enhancement data for the custom report, wherein the custom report is further based on the enhancement data.

11. A computer infrastructure for generating a custom report in a portal environment, the computer infrastructure comprising a processor and a memory and being configured to:
    receive content for the custom report;
    obtain graphic information to generate the custom report, the graphic information defining a set of attributes to display the content;
    generate a tagged file based on the content and the graphic instructions, the generating of the tagged file including:
        detecting a file including new data for the custom report;
        extracting the content from the detected file;
        selecting at least one of a plurality of report templates based on at least one of: an attribute of the content or a data item in the content;

obtaining at least one graphic instruction for the custom report from the selected at least one report template; and generating the tagged file based on the data and the at least one graphic instruction;

generate and store image data, in a graphical format, to be included in the custom report based on a first portion of the content and the graphic information of the tagged file in response to the presence of a new tagged file;

obtain a report definition for the custom report separate from the tagged file, the report definition including at least one detail for generating the custom report, the at least one detail including information for rendering the custom report and static content for the custom report;

generate and store the custom report in response to a first request for the custom report and subsequent to the image data being stored in a first format, the generating of the custom report being based on the image data, the tagged file, and the report definition, wherein the custom report includes the content to be included in the custom report and the image data arranged according to the report definition; and generate and store the custom report in response to a second request for the custom report and subsequent to the image data being stored in a second format, the generating of the custom report being based on the image data, the tagged file, and the report definition, wherein the custom report includes a second portion of the content in the tagged file and the image data arranged according to the report definition.

12. The computer infrastructure of claim 11, being further configured to obtain enhancement data for the custom report, wherein the custom report is further based on the enhancement data.

13. The computer infrastructure of claim 11, being further configured to store the custom report in a distribution database.

14. The method of claim 1, further comprising:

determining the presence of the new tagged file, the determining including one of: receiving notification of the new tagged file or periodically checking for the new tagged file; and updating at least one of: the image data or the custom report based on the new tagged file.

15. The method of claim 1, further comprising generating and storing a second custom report, the second custom report being distinct in format from the custom report.

16. The method of claim 15, wherein the custom report is in a proprietary report format, and the second custom report is in a web report format.

* * * * *